(12) United States Patent
Monfared et al.

(10) Patent No.: US 7,047,471 B2
(45) Date of Patent: May 16, 2006

(54) VOLTAGE MARGIN TESTING OF BLADED SERVERS

(75) Inventors: Akbar Monfared, Placerville, CA (US); Steve Mastoris, El Dorado Hills, CA (US); Michelle Cavanna, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 595 days.

(21) Appl. No.: 10/378,248

(22) Filed: Mar. 3, 2003

(65) Prior Publication Data

US 2004/0181730 A1    Sep. 16, 2004

(51) Int. Cl.
G05F 1/66    (2006.01)
(52) U.S. Cl. ............... 714/745; 323/318; 700/298; 713/310
(58) Field of Classification Search ............... 328/318; 700/297–298; 713/310; 714/745
See application file for complete search history.

(56) References Cited

U.S. PATENT DOCUMENTS 4,418,403 A * 11/1983 O'Toole et al. ............. 714/745
6,049,500 A *  4/2000 Kajigaya et al. ........ 365/230.02
6,833,721 B1* 12/2004 Park et al. .................. 324/765

FOREIGN PATENT DOCUMENTS

DE    3146383 A1 *  5/1983
DE    4119233 A  * 12/1992
JP    54045769 A  *  4/1979

OTHER PUBLICATIONS

Tsukude, M. et al.; Highly reliable testing of ULSI memories with on-chip voltage-down converters; Design & Test of Computers, IEEE vol.: 10 , Issue: 2 pp.: 6-12; Jun. 1993; ISSN: 0740-7475.*
Hewlett-Packard Company, HP Manageability Solution Brief: HP Blade Server Environment, Apr. 2002.
Hewlett-Packard Company, HP Blade Server Data Sheet, Dec. 2001.
Dallas Semiconductor, "Dual Digital Potentiometer with EEPROM", pp. 1-14.

* cited by examiner

Primary Examiner—R. Stephen Dildine

(57) ABSTRACT

A voltage margin testing blade is adapted for use in a bladed server having at least one internal adjustable power supply. The testing blade is further adapted to provide a control signal to the power supply indicative of any desire to modify the output voltage of the power supply. The testing blade senses the output voltage of the power supply and compares it to a desired power supply voltage. The control signal is generated in response to this comparison in order to control the actual power supply voltage at or about the desired power supply voltage.

27 Claims, 4 Drawing Sheets

VOLTAGE MARGIN TESTING OF BLADED SERVERS

FIELD OF THE INVENTION

The present invention relates generally to voltage margin testing.

BACKGROUND

Bladed servers are comprehensive computing systems that include processors, memory, network connections and associated electronics, all on a single motherboard called a blade. This high-density technology addresses the current trend among large computing centers to reduce space requirements while lowering their total cost of ownership. A server blade, along with storage, networking and other blades, are typically installed in a rack-mountable enclosure that houses multiple blades that share common resources such a cabling, power supplies and cooling fans.

In the design and manufacture of electronic components, it is common to perform testing to help detect or identify material, process and design weaknesses of the components. Such testing is desirable as it helps ensure the delivery of high-quality and reliable products to the end consumer.

One common test is voltage margin testing. A component may work satisfactorily at nominal supply voltages, but a dip or rise in the voltage may cause a marginal component to fail. Such dips or rises are a part of normal operating conditions due to such factors as electromagnetic interference or line noise, or variations in components of the power supply or its manufacturing process.

Voltage margin testing is generally accomplished using automated tester equipment to provide a variable external power supply. Often, these stationary testers are expensive, with some as much as $40,000 each. Additionally, such stationary testers are generally impracticable in the field.

For the reasons stated above, and for other reasons stated below that will become apparent to those skilled in the art upon reading and understanding the present specification, there is a need in the art for alternative apparatus and methods for voltage margin testing of bladed servers.

SUMMARY

The various embodiments described herein facilitate voltage margin testing, particularly in bladed servers. The various embodiments facilitate such testing by providing a voltage margin testing blade adapted for use in a bladed server having at least one internal adjustable power supply. The testing blade is further adapted to provide a control signal to the power supply indicative of any desire to modify the output voltage of the power supply. The testing blade senses the output voltage of the power supply and compares it to a desired power supply voltage. The control signal is generated in response to this comparison in order to control the actual power supply voltage at or about the desired power supply voltage.

Embodiments of the invention include apparatus and methods of varying scope.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

The various embodiments include apparatus and methods for voltage margin testing of bladed servers and their various components. Such testing is facilitated using a voltage margin blade or testing blade in accordance with an embodiment of the invention. The testing blades of various embodiments utilize substantially the same form factor as other blades of the bladed server, i.e., the testing blades of the various embodiments may be inserted in an available slot of the bladed server or may be swapped with a non-essential blade of the bladed server if there are no available slots. An example of a standard form factor utilized in bladed systems includes the cPCI (compact Peripheral Component Interconnect) form factor. This is one industry-standard for the connection and communication of computer devices. These standards often specify bus communication protocols as well as physical connectivity and pin layout for the various power supplies and signal types.

Figure 1:
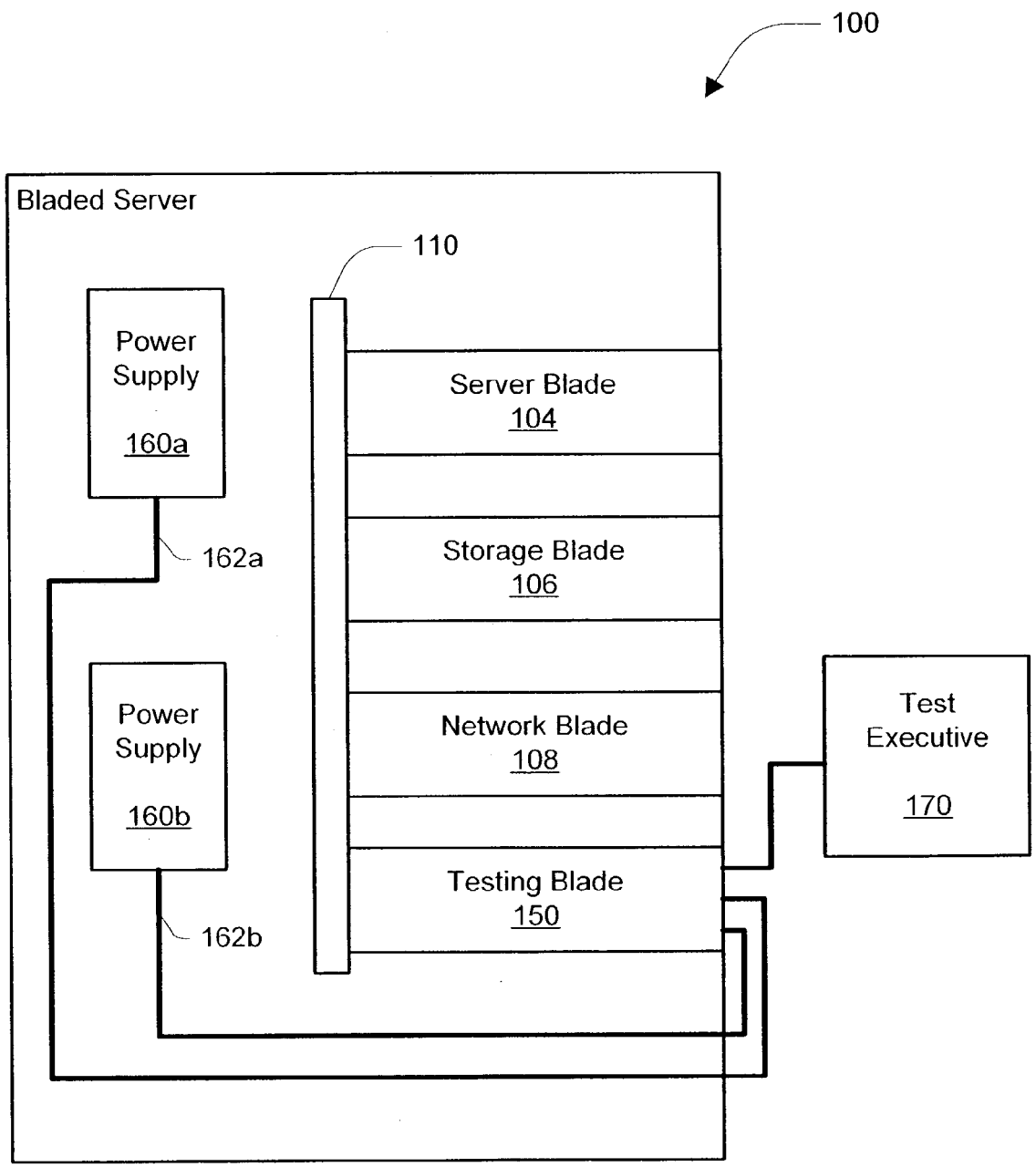
FIG. 1 is a block diagram of a bladed server in accordance with an embodiment of the invention.

FIG. 1 is a block diagram of a bladed server 100 in accordance with an embodiment of the invention. The bladed server 100 includes a chassis 102 housing at least one server blade 104 to provide server functionality. The bladed server 100 further typically includes one or more storage blades 106 for storage of data or other information and at least one network blade 108 for communication of the bladed server 100 across a computer network, such as a local area network (LAN) or wide area network (WAN). The bladed server 100 further includes a testing blade 150 in accordance with an embodiment of the invention. The testing blade 150 may be permanently installed in the bladed server 100. However, it is contemplated that the testing blade 150 will be more advantageous as a portable device. In this manner, one testing blade 150 may be used to individually test multiple bladed servers.

Each blade of the bladed server 100 is coupled to a backplane 110. The backplane 110 may be referred to as a midplane depending upon the location of the backplane 110 to the orientation of the blades, i.e., whether it is located opposite or adjacent a bulkhead of the blades. However, for consistency, the term backplane will be used herein regardless of its location relative to the orientation of the blades. The backplane 110 provides communication channels and power inputs for each of the blades of the bladed server 110.

To power the various blades of the bladed server 100, one or more internal and adjustable power supplies 160 are included. The power supplies 160 receive a supply potential from an external source (not shown). An example of an external source includes an AC power main. Another example of an external source includes a 48V DC power source such as is typical for telecommunications applications. Each power supply 160 takes the supply potential from the external source and converts that potential to a potential desired for the operation of the bladed server. As one example, the power supply 160a may be adapted to provide 3.3V DC and the power supply 160b may be adapted to provide 5.1V DC. Additionally or in the alternative, redundancy may be utilized such that two power supplies 160 provide the same potential, with one power supply 160 operating as a primary device and another power supply 160 operating as a redundant device.

For voltage margin testing, the testing blade 150 is coupled to an input 162 of each power supply 160 to provide a control signal, such as a trim voltage, to regulate the power supplies 160. A test executive 170 is coupled to the testing blade 150. A test executive is typically an application for automated sequencing of test programs. These test programs typically provide a user interface for the testing process, log test data and determine whether a particular test has passed or failed. However, the test executive 170 may represent a user interface for manual input to the testing blade 150.

The test executive 170 may be capable or adapted to perform testing other than voltage margin testing involving the testing blade 150. As such, it is preferred that the testing blade 150 pass commands and data from the test executive 170 to other blades of the bladed server 100 unaltered until the test executive 170 invokes the testing blade 150. Invoking the testing blade 150 can be through a special escape sequence or other data pattern that signals the testing blade 150 that voltage margin testing is desired. This escape sequence should not be passed through to other blades.

Figure 2:
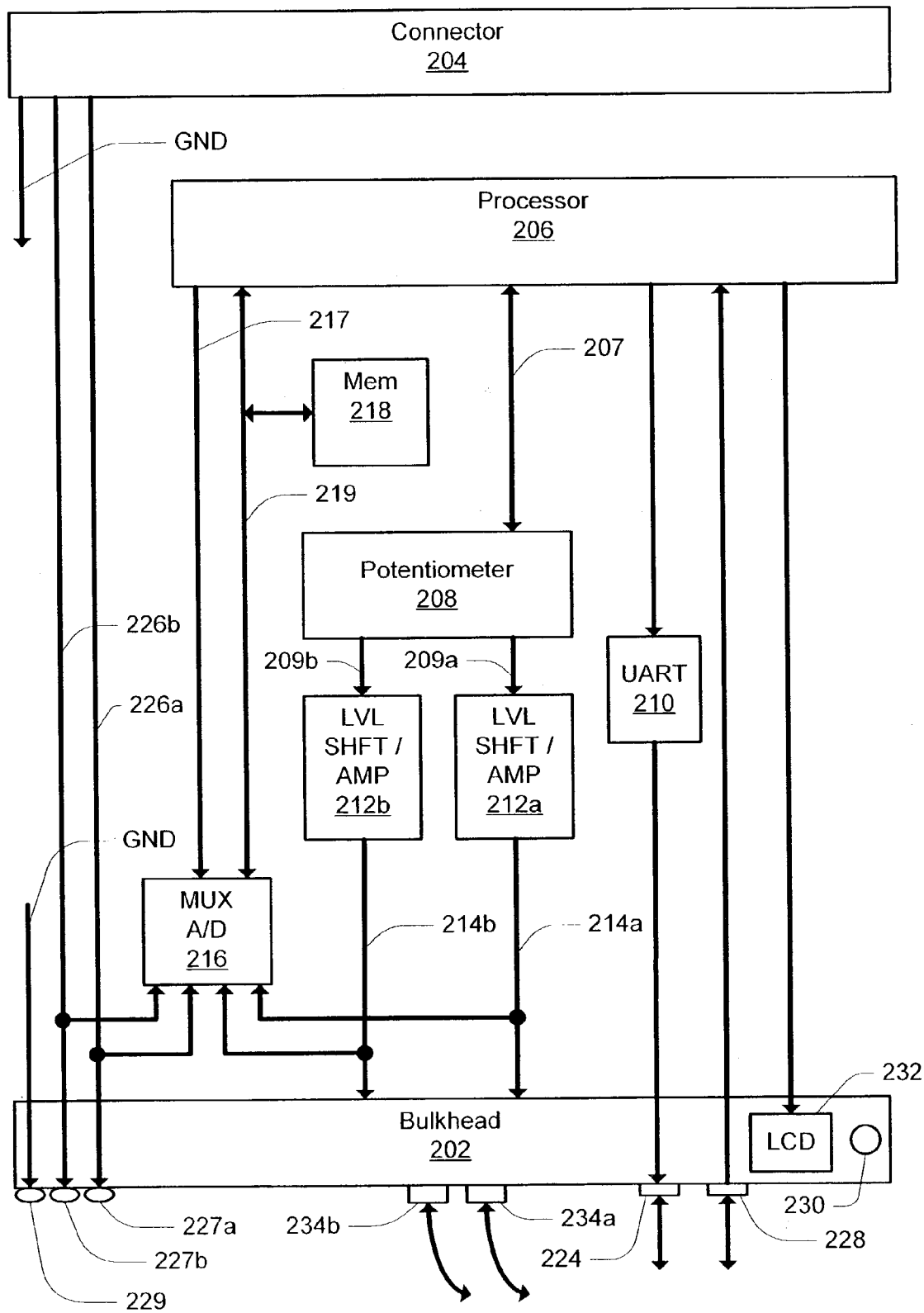
FIG. 2 is a functional block diagram of a voltage margin blade in accordance with an embodiment of the invention.

FIG. 2 is functional block schematic of a testing blade 250 in accordance with an embodiment of the invention. The testing blade 250 includes a faceplate or bulkhead 202 as a signal interface and a connector 204 for coupling to a communication bus or backplane. The bulkhead 202 for most blades typically includes status indicators. These status indicators are often in the form of LEDs (light-emitting diodes) providing state indication, e.g., active, disconnected, failed, etc., or LCDs (liquid crystal displays) providing alphanumeric, graphical or other indications, e.g., error codes, analog readings, histograms or text messages. For one embodiment, the testing blade 250 includes an LED indicator 230 and an LCD indicator 232.

The testing blade 250 further includes a microcontroller unit or processor 206 for controlling the operation of the testing blade 250. Communications from the processor 206 may pass through a UART (universal asynchronous receiver/transmitter) 210 for providing asynchronous data at a data output 224 of the bulkhead 202. The data output 224 may be used for communication with other blades of a bladed server. A data input 228 of the bulkhead 202 may be used for commands and data from a test executive or other user interface. A memory 218 may be used to store commands and data values, such as discrete desired power supply voltages or data used to derive the desired power supply voltages, such as an initial value, an end value and an increment value.

The testing blade 250 is adapted to provide margining of one or more power supply voltages by sensing the voltage on a power supply rail and generating a rail trim voltage 214 or other control signal for use by the power supply to adjust the power supply voltage to a desired level. The various embodiments assume that the power supply is responsive to a trim voltage to adjust its output. However, other types of control signals may be used depending upon the power supply used. For example, if the power supply is digitally controlled, a digital control signal would be appropriate. Similarly, a translator may be interposed between the testing blade 250 and its power supply to translate the control signal to a form usable by the power supply. For example, the testing blade 250 could provide a digital control signal indicative of a desire to modify the power supply output and a digital-to-analog converter could be used to convert the digital signal to a trim voltage usable by the power supply. It is noted that a signal indicative of a desire to modify the power supply output may indicate that no modification is required.

For the embodiment depicted in FIG. 2, each rail trim voltage 214a or 214b is generated in response to a sensed power supply voltage on rail 226a or 226b, respectively, in comparison to a desired power supply voltage. For one embodiment, each sensed power supply voltage on rails 226a and 226b is converted to a digital signal, such as by an analog-to-digital converter 216, and provided to the processor 206 along an I/O line 219. The analog-to-digital converter 216 may further be multiplexed in response to a channel select signal 217 for converting a selected one of a number of analog voltage signals into a corresponding digital signal for use by the processor 206. Alternatively, a dedicated analog-to-digital converter 216 may be provided for each voltage signal.

The digital signal or value representative of the sensed power supply voltage on rail 226a or 226b is then provided to the processor 206 for comparison to the desired power supply voltage. The power supply rail trim voltage 214a or 214b, or other control signal indicative of a desire to modify the power supply voltage on rail 226a or 226b, respectively, is then generated in response to this comparison. As one example, the processor 206 adjusts a wiper position of a digital potentiometer 208 in response to the difference between the sensed power supply voltage on rail 226a or 226b and the desired power supply voltage. The potentiometer 208 is responsive to a control signal 207 generated by the processor 206. The control signal 207 may be generated through a variety of control techniques well known in the art of process control. As one example, the control signal 207 may simply be proportional to the difference of the sensed power supply voltage on rail 226a or 226b and the desired power supply voltage, i.e., some gain factor multiplied by the difference. For a quicker and more stable response, integral and derivative control techniques may further be employed. These control techniques take into account the magnitude and rate of change in the sensed power supply voltage on rail 226a or 226b in order to increase the reaction time while simultaneously reducing the chance of overcorrecting. The invention is not limited to any particular control technique as long as the control signal 207 is generated in response to the differential between the two values and is indicative of a desire to control the power supply voltage to approach the desired power supply voltage. Additionally, comparison of the power supply voltage and the desired power supply voltage is not limited to a comparison of digital values by the processor 206. Such comparison also could be performed by an analog comparator (not shown) in conjunction with the processor 206. An analog comparator coupled between the power supply rails 226a or 226b and the processor 206 and having inputs of a reference value, e.g., the desired power supply voltage, and the power supply voltage from the rail of interest could provide an output signal indicating the relationship between the power supply voltage and the reference value for action by the processor.

The output of the potentiometer 208, a first trim voltage or control signal 209a or 209b, may be provided to a level shifter and amplifier 212a or 212b, respectively, to generate the power supply rail trim voltage 214a or 214b, respectively, having a range appropriate to the adjustable power supply (not shown in FIG. 2), e.g., +/−10V. It is noted that the blade 250 may be used to perform margin testing of more than one power supply rail. In the example shown, blade 250 provides trim voltages 214a and 214b for the power supply voltages of the two power supply rails 226a and 226b, respectively. To provide testing of both rails simultaneously, in the example depicted in FIG. 2, the two power supply trim voltages 214a and 214b are generated at the outputs of two level shifter and amplifiers 212a and 212b, respectively. Each level shifter and amplifier 212a and 212b utilizes a separate output of the digital potentiometer 208, thus digital potentiometer 208 would include a potentiometer for each desired output. Access ports 227a and 227b may be provided to externally sample the power supply voltages of rails 226a and 226b, respectively. Access port 229 may also be provided to externally sample a ground potential used by the testing blade 250. Additionally, for one embodiment, ports 234a and 234b may be used to receive actual trim voltages of the power supply.

Figure 3:
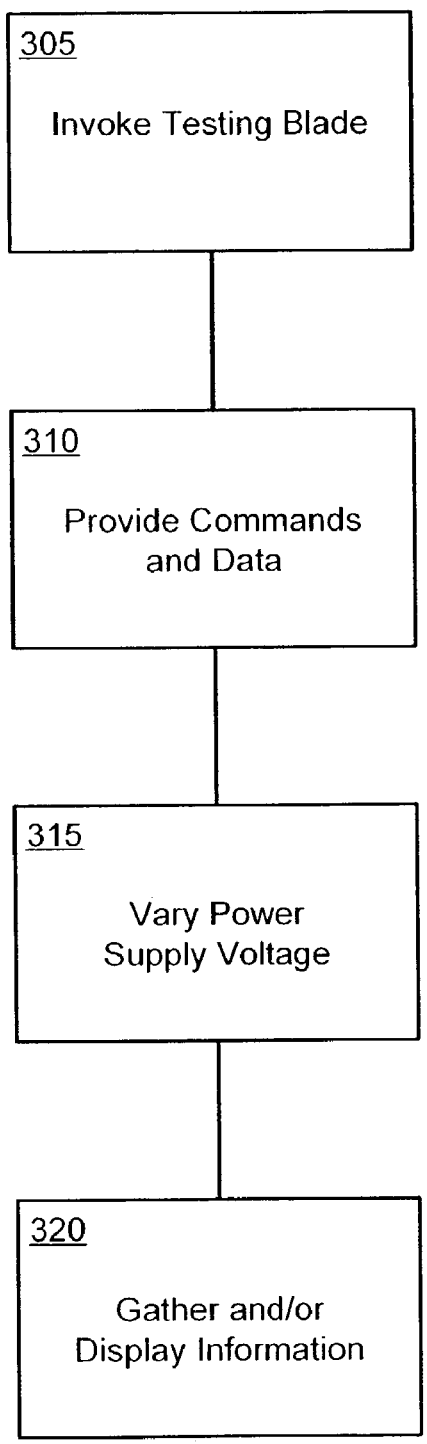
FIG. 3 is a flowchart of one embodiment of operating a bladed server.

FIG. 3 is a flowchart showing testing of a bladed server in accordance with an embodiment of the invention. At 305, the test executive invokes the testing blade. For one embodiment, this involves sending an escape sequence to a data input of the testing blade. At 310, commands and data are provided to the testing blade from the test executive to instruct the testing blade to adjust one or more power supply voltages for testing of the bladed server or individual blades at operating voltages that are lower or higher than nominal conditions. The data may be stored in memory contained on the testing blade. Alternatively, the data may be provided to the test executive. While it is possible to manually provide data and commands to the testing blade such that a user or administrator acts as the test executive, it is preferred that the test executive be automated to sequence the testing blade through a variety of operating conditions without further user interaction.

At 315, the testing blade varies the power supply voltages in response to the data and commands provided by the test executive. A typical test sequence might be to vary each power supply voltage from −10% of nominal to +10% of nominal, such as by 1% increments. At 320, the testing blade gathers and/or displays information related to the operation of the bladed server at the various voltages, such as measured operating conditions, desired settings, any error or status codes generated by the blades, etc. By adjusting the power supply voltages of the bladed server, operation at marginal conditions may assist in identifying and exposing latent failures of the bladed server's components. In addition, during design phases, such testing can provide guidance on component selection to facilitate improvements in device quality and reliability.

Figure 4:
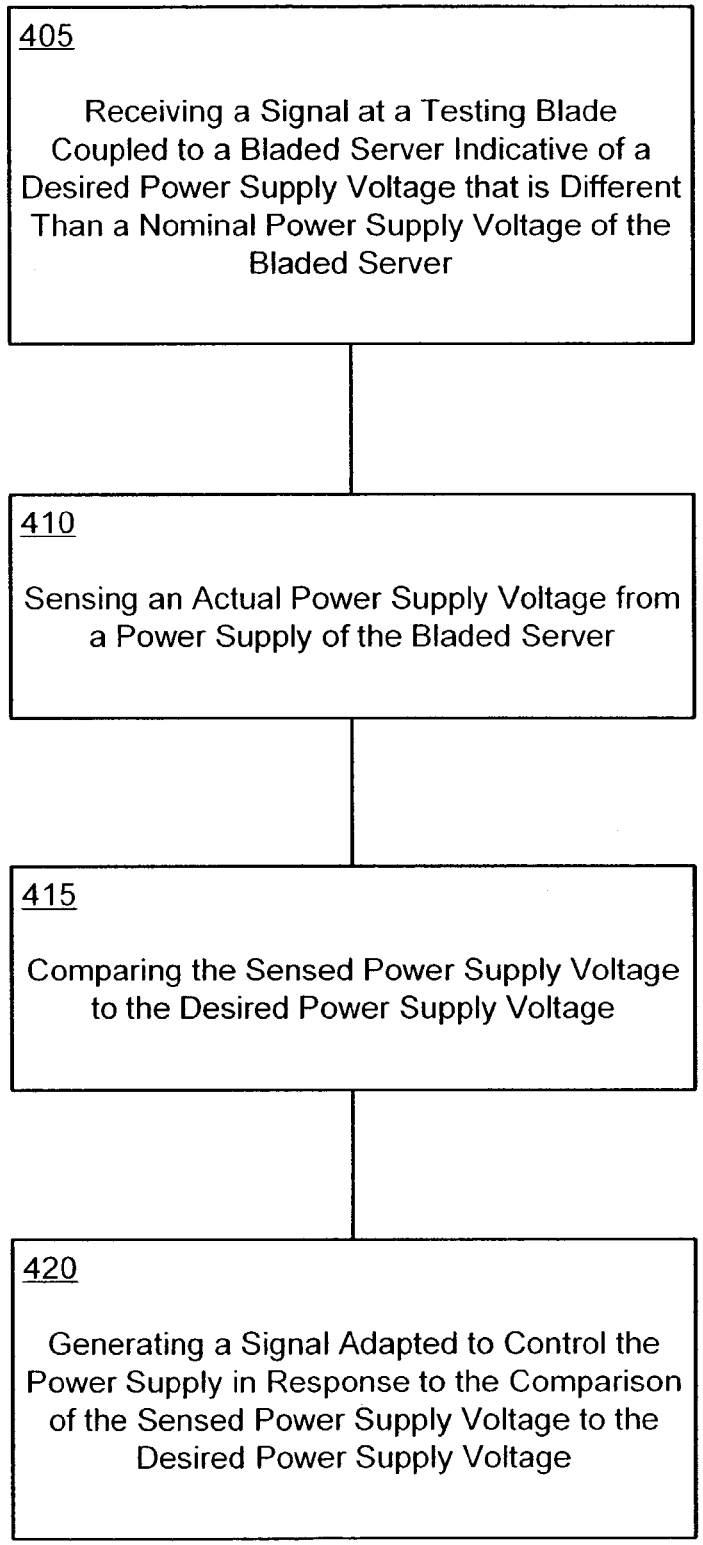
FIG. 4 is a flowchart of a further embodiment of operating a bladed server.

FIG. 4 is a flowchart showing testing of a bladed server in accordance with a further embodiment of the invention. At 405, a signal is received at a testing blade coupled to the bladed server. The signal is indicative of a desired power supply voltage that is different than a nominal power supply voltage of the bladed server. The testing blade is adapted to provide a control signal to a power supply of the bladed server indicative of any desire to modify the output voltage of the power supply.

Additional signals may be received at the testing blade for indicating multiple desired power supply voltages, thus permitting the testing of a range of desired power supply voltages. The multiple signals may each represent discrete values of the desired power supply voltages. For another embodiment, the multiple signals may be indicative of an initial value for the desired power supply voltage, an end value for the desired power supply voltage and incremental changes in the desired power supply voltage between the initial value and the end value.

At 410, the actual power supply voltage of the bladed server's power supply is sensed. The sensed power supply voltage is compared to a desired power supply voltage at 415. As noted previously, comparing of the sensed power supply voltage to the desired power supply voltage can be performed by a variety of comparison circuits and can include comparison of analog to analog values or digital to digital values. At 420, a signal adapted to control the power supply in response to the comparison of the sensed power supply voltage to the desired power supply voltage is generated. Circuits for control signal generation can vary depending upon the desired type and range of control signal appropriate to the adjustable power supply. The method of FIG. 4 may be repeated variety of desired power supply voltages or multiple power supplies of the bladed server.

CONCLUSION

A voltage margin testing blade is adapted for use in a bladed server having at least one internal adjustable power supply. The testing blade is further adapted to provide a control signal to the power supply indicative of any desire to modify the output voltage of the power supply. The testing blade senses the output voltage of the power supply and compares it to a desired power supply voltage. The control signal is generated in response to this comparison in order to control the actual power supply voltage at or about the desired power supply voltage.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. As one example, the testing blade could be modified in accordance with the foregoing description to provide for testing of more than two power supplies. Accordingly, this application is intended to cover any adaptations or variations of the invention. It is manifestly intended that this invention be limited only by the following claims and equivalents thereof.

What is claimed is:

1. A voltage margin testing blade, comprising:
   means for coupling the testing blade to a backplane of a bladed server;
   means for sensing a power supply voltage for the bladed server;
   means for comparing the power supply voltage sensed by the means for sensing with a value indicative of a desired power supply voltage; and
   means for generating a control signal in response to the comparison, wherein the control signal is indicative of a desired modification to the power supply voltage.

2. The testing blade of claim 1, wherein the means for coupling further comprises an industry-standard form factor for the connection and communication of computer devices.

3. The testing blade of claim 1, wherein the industry-standard form factor is a compact PCI connector.

4. The testing blade of claim 1, wherein the means for generating a control signal further comprises means for converting a digital control signal to a voltage signal and means for level shifting and amplifying the voltage signal.

5. A testing blade for a bladed server, comprising:
a connector adapted for receiving a power supply voltage of the bladed server;
a processor adapted to compare a value indicative of the power supply voltage with a value indicative of a desired power supply voltage, wherein the processor is further adapted to generate a signal indicative of a desire to modify the power supply voltage in response to the comparison.

6. The testing blade of claim 5, wherein the connector is adapted to couple to a backplane of the bladed server.

7. The testing blade of claim 6, further comprising additional blades coupled to the backplane of the bladed server, wherein the testing blade and the additional blades all have the same form factor.

8. The testing blade of claim 7, wherein the form factor is a compact PCI form factor.

9. A method of operating a bladed server, comprising:
receiving a signal at a testing blade coupled to the bladed server, wherein the signal is indicative of a desired power supply voltage that is different than a nominal power supply voltage of the bladed server;
sensing an actual power supply voltage from a power supply of the bladed server;
comparing the sensed power supply voltage to the desired power supply voltage; and
generating a signal adapted to control the power supply in response to the comparison of the sensed power supply voltage to the desired power supply voltage.

10. The method of claim 9, further comprising receiving additional signals indicative of multiple desired power supply voltages.

11. The method of claim 10, wherein receiving additional signals indicative of multiple desired power supply voltages further comprises receiving data indicative of an initial value for the desired power supply voltage, data indicative of an end value for the desired power supply voltage and data indicative of incremental changes in the desired power supply voltage between the initial value and the end value.

12. The method of claim 9, further comprising:
repeating the method for a variety of desired power supply voltages.

13. A blade for a bladed server, comprising:
an analog-to-digital converter adapted to receive a power supply voltage of the bladed server and to generate a digital signal indicative of the power supply voltage;
a memory for storing a value indicative of a desired power supply voltage;
a processor adapted to compare the digital signal indicative of the power supply voltage to the value indicative of the desired power supply voltage, wherein the processor is further adapted to generate a control signal in response to the comparison;
a potentiometer responsive to the control signal to generate a first trim voltage; and
a level shifter and amplifier responsive to the first trim voltage to generate a second trim voltage ranging from a first value, indicating a desire to decrease the power supply voltage, to a second value, indicating a desire to increase the power supply voltage.

14. The blade of claim 13, further comprising a potentiometer and a level shifter and amplifier for each power supply voltage to be received.

15. The blade of claim 13, further comprising a multiplexer for selectively providing one of a number of power supply voltages to the analog-to-digital converter.

16. A voltage margin testing blade, comprising:
a connector for coupling the testing blade to a backplane of a bladed server;
a sensor coupled to the connector for sensing a power supply voltage for the bladed server;
a comparison circuit coupled to the sensor for comparing the power supply voltage sensed by the sensor with a reference value; and
a control signal generation circuit coupled to the processor for generating a control signal in response to the comparison, wherein the control signal is indicative of a desired modification to the power supply voltage.

17. The voltage margin testing blade of claim 16, wherein the sensor is an analog-to-digital converter coupled to receive the power supply voltage and the comparison circuit is a processor coupled to receive a digital output of the analog-to-digital converter for comparison with a digital reference value.

18. The voltage margin testing blade of claim 16, wherein the control signal generation circuit comprises a potentiometer coupled to receive a digital control signal from the processor and to provide an analog control signal indicative of the desired modification to the power supply voltage.

19. The voltage margin testing blade of claim 18, wherein the control signal generation circuit further comprises a level shifter and amplifier for adjusting a range of the analog control signal.

20. A method of testing a bladed server, comprising:
invoking a testing blade of the bladed server through a test executive;
receiving commands and data at the testing blade from the test executive to instruct the testing blade to adjust at least one power supply voltage for operating at voltages that are lower or higher than nominal conditions;
varying the at least one power supply voltage in response to the commands and data received from the test executive; and
gathering information related to the operation of the bladed server at the at least one power supply voltage.

21. The method of claim 20, wherein invoking the testing blade comprises sending an escape sequence to a data input of the testing blade.

22. The method of claim 20, wherein the test executive is automated to sequence the testing blade through a variety of operating conditions.

23. A bladed server, comprising:
a chassis having a backplane and an adjustable power supply;
at least one server blade coupled to the backplane for providing server functionality and coupled to the adjustable power supply for receiving a power supply voltage; and
a voltage margin testing blade coupled to the backplane, wherein the voltage margin testing blade comprises:
a connector adapted for receiving the power supply voltage of the adjustable power supply;
a processor adapted to compare a value indicative of the power supply voltage with a value indicative of a desired power supply voltage, wherein the processor is further adapted to generate a signal indicative of a desire to control the adjustable power supply in response to the comparison;

wherein the adjustable power supply is coupled to receive the signal indicative of the desire to control the adjustable power supply.

24. The bladed server of claim 23, wherein the desired modification to the power supply voltage is selected from the group consisting of decreasing the power supply voltage from its present level, increasing the power supply voltage from its present level, and maintaining the power supply voltage at its present level.

25. The bladed server of claim 23, further comprising a translator coupled between the adjustable power supply and the voltage margin testing blade, wherein the translator is adapted to translate the signal indicative of the desire to control the adjustable power supply to a form usable by the adjustable power supply.

26. A bladed server, comprising:
a chassis having a backplane and an adjustable power supply;
at least one server blade coupled to the backplane for providing server functionality and coupled to the adjustable power supply for receiving a power supply voltage; and
a voltage margin testing blade coupled to the backplane, wherein the voltage margin testing blade comprises:
means for sensing the power supply voltage;
means for comparing the power supply voltage sensed by the means for sensing with a value indicative of a desired power supply voltage; and
means for generating a control signal in response to the comparison, wherein the control signal is indicative of a desired modification to the power supply voltage;
wherein the adjustable power supply is coupled to receive the control signal and is adapted to respond to the control signal.

27. The bladed server of claim 26, wherein the means for generating the control signal further comprises means for converting a digital control signal to a voltage signal and means for level shifting and amplifying the voltage signal.

* * * * *